UNITED STATES PATENT OFFICE.

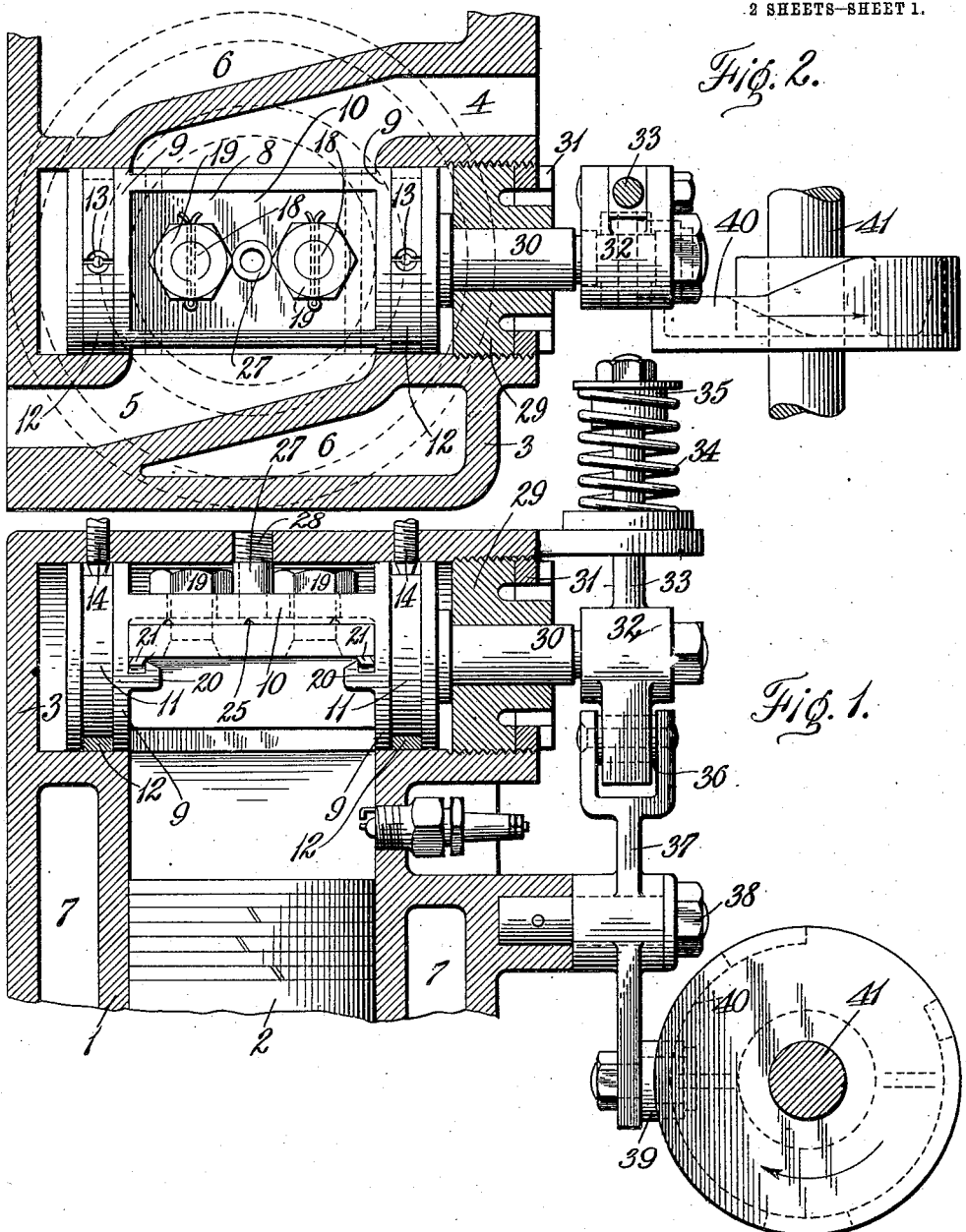

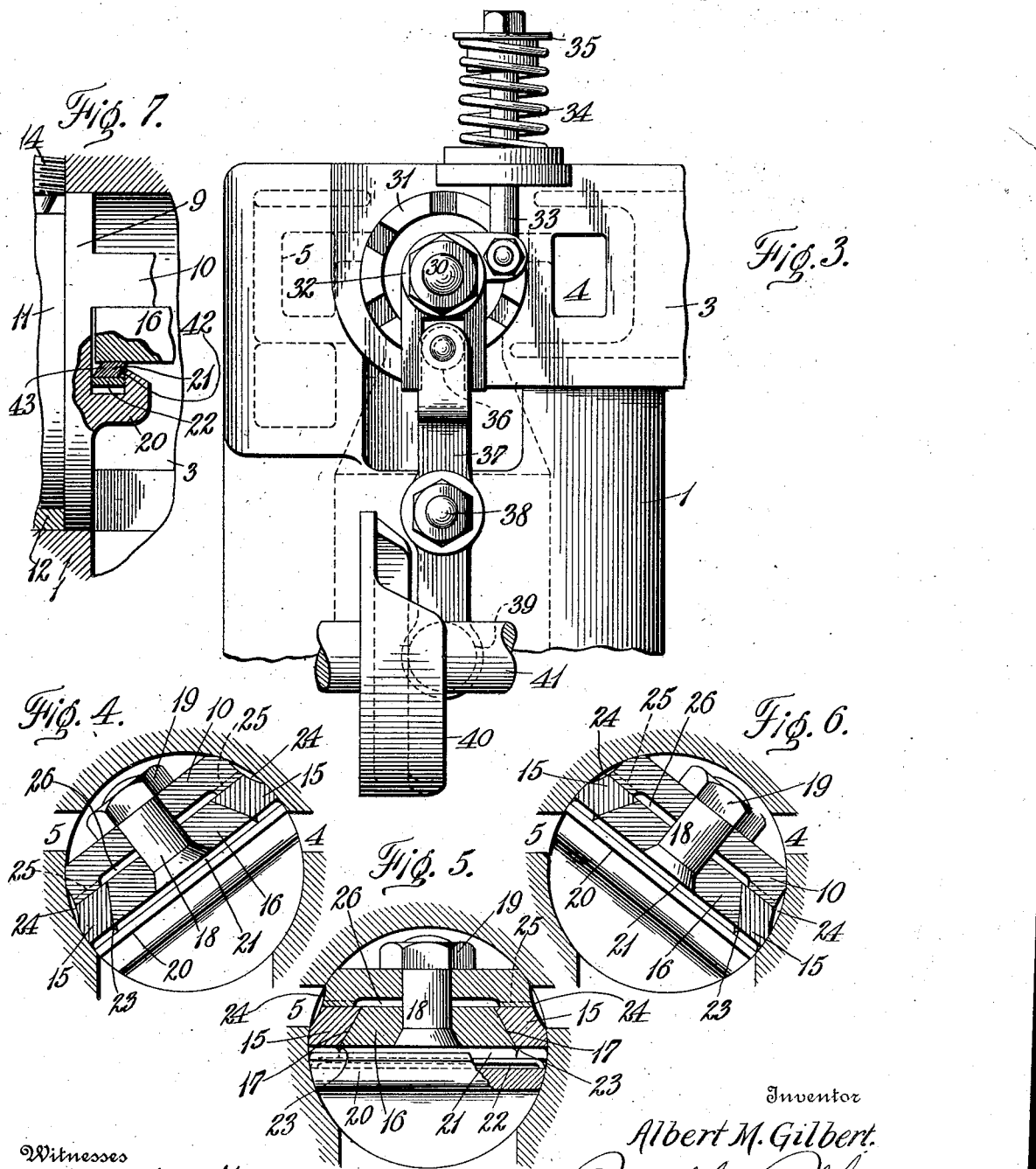

ALBERT M. GILBERT, OF DETROIT, MICHIGAN.

VALVE FOR ENGINES.

1,076,972.    Specification of Letters Patent.    Patented Oct. 28, 1913.

Application filed June 14, 1912. Serial No. 703,616.

*To all whom it may concern:*

Be it known that I, ALBERT M. GILBERT, a citizen of the United States of America, residing at Detroit, in the county of Wayne and State of Michigan, have invented certain new and useful Improvements in Valves for Engines, of which the following is a specification, reference being had therein to the accompanying drawings.

This invention relates to improvements in internal combustion engines and more particularly to a valve construction therefor.

The object of the invention is to provide a simple, compact and easily assembled construction which is such as to obviate the possibility of leakage and loss of compression in the cylinder.

A further object of the invention is to so construct the valve, as to provide for wear of the parts and an adjustment thereof to maintain a close fit for preventing leakage and also to provide simple and efficient means for imparting to the valve an oscillatory movement.

It is also an object of the invention to provide means for lubricating the valve and to provide certain other new and useful features in the construction and arrangement of parts.

To these ends the invention consists in the matters hereinafter set forth and more particularly pointed out in the claims reference being had to the accompanying drawings in which—

Figure 1 is a vertical section through the upper end of the cylinder of an engine showing a valve and its operating mechanism embodying this invention in place thereon; Fig. 2 is a horizontal section of the same; Fig. 3 is a side elevation; Figs. 4, 5 and 6 are sectional details of the valve showing the same in inlet compression and exhaust positions respectively; and Fig. 7 is a sectional detail of an end packing.

In the drawings a single cylinder is shown but it will be understood that the invention will apply as well to an engine embodying any desired number of cylinders, the valve construction being duplicated for each cylinder.

The cylinder 1 is bored in the usual manner to receive a piston 2 of the usual construction and the upper end or head 3 of the cylinder is bored transversely at right angles to the cylinder and directly across the upper end thereof to form a seat for a cylindrically shaped valve adapted to turn therein. The cylinder head is also formed with an inlet passage 4 and an exhaust passage 5 leading to ports in the sides of the bore or seat for the valve. The head may also be formed if desired, with a water space 6 surrounding the passages and seat and communicating with the water jacket 7 surrounding the cylinder. A cylindrical valve 8 which fits loosely within the seat or bore in the head and is adapted to turn therein, comprises a casting having circular ends or heads 9 connected by a flat bar or bridge 10 extending between the heads at a distance to one side of the longitudinal axis of the valve and each head is formed with a peripheral groove 11 to receive a packing ring 12 which is split or divided transversely and bored radially at its point of severance as at 13. A counter-sink is formed in the outer face of each ring where it is bored and split, to receive the tapered inner end of a screw plug 14 engaging screwthreaded openings in the upper end of the cylinder head and adapted to be screwed into engagement with the rings to spread the same within the bore for the valve and hold them firmly in place within the grooves 11. The plugs 14 are preferably the stems of compression grease cups (not shown) by means of which lubricant may be forced into the grooves in the heads of the valve to thoroughly lubricate the bearing surfaces. As the heads fit the bore loosely and the rings are expanded and thus firmly held in the bore, said rings also form bearings for the valve, supporting the same within the grooves in the heads.

To engage the inner surface of the bore or seat for the valve and prevent leakage past the valve and out through the ports, packing strips 15 are seated along the side edges of the bridge 10, said strips being preferably formed of phosphor bronze or other suitable metal which will not adhere to the bearing surface and the inner adjacent sides of these strips are formed slanting or inclined inwardly toward the bridge to provide a seat for a plate 16 having similarly beveled or inclined edges 17. This plate is held in place by means of bolts 18 having heads seating within counterbored recesses in the lower side of the plate and these bolts extend through the plate and through holes in the bridge bar 10 and are provided upon their upper ends with nuts 19. The face of the bridge 10 adjacent to the plate is cut away slightly to allow the plate to move and thus when the force of the compression and explosion within the cylinder comes against the plate 16, said plate will be moved toward the bridge bar slightly and the strips 15, by reason of the engagement of their beveled edges with the plate, will be forced into firm engagement with the bearing surface of the bore or seat of the valve. As these strips wear away the nuts 19 may be turned up to draw the plate 16 farther toward the bridge and thus force the strips outward as their outer sides are worn away.

To make a tight joint between the ends of the plate 16 and the inner sides of the heads 9, said heads are formed with inwardly extending flanges 20 which flanges are grooved at their upper sides adjacent to the ends of the plate to receive packing strips 21 which are backed up within the bottoms of the grooves by spring members 22 which act to firmly hold the packing strips against the lower face of the plate and strips 15. These packing strips 21 are preferably made in three parts or sections, a long middle section of substantially the length of the width of the plate 16 and two end sections to engage the wear strips 15, said sections having rounded adjacent corners 23 to permit them to move independently.

The edge faces of the bridge 10 and wear strips 15 are preferably cut away slightly as at 24 to provide oil grooves for lubricating the bearing surface of the valve seat and lubricant is admitted to these grooves through small grooves 25 formed in the lower face of the bridge bar and opening into the cut away central portion of the bridge bar opposite the plate 16, a space 26 being thus formed to provide a lubricant chamber which may be supplied with lubricant through a tubular boss 27 on the bridge bar extending upward into engagement with the bearing surface of the seat of the valve. An opening 28 is provided in the top of the cylinder head to register with the end of the tube 27 and into this opening may be screwed a cup or other means for forcing the lubricant into the tube.

The valve is held in its bore or seat in the head by the packing rings 12 which are expanded within the bore and by a screw plug or nut 29 within the screw threaded outer end of the bore. A stem 30 formed integral with one head of the valve extends outward through the plug 29 and forms means for turning the valve. A locking ring 31 is provided to engage the outer end of the plug 29 and hold the same from turning.

To oscillate the valve in timed relation to the movement of the piston, a bell crank 32 is secured upon the outer end of the stem 30 and to the laterally extending arm of the bell crank is pivotally attached the lower end of a rod 33 which extends upward through a guide bearing on the cylinder head and through a coiled spring 34 which is engaged by a cap 35 secured in any suitable manner upon the upper end of the rod. The spring 34 acts to normally hold the valve turned to the position shown in Fig. 4 or inlet position. The downwardly extending arm of the bell crank is forked to embrace a roller 36 carried by the upper end of a rocker arm 37 which is pivoted intermediate its ends at 38 to a suitable support on the engine cylinder. The lower end of the rocker bar is provided with an anti-friction roll 39 to engage the cam flange 40 of a cam wheel which is mounted upon a shaft 41 driven in any suitable manner (not shown) from the crank shaft or other moving part of the engine in timed relation to the movement of the piston. The spring 34 acts to hold the roll 39 in contact with the cam flange of the cam wheel and said flange acts as the shaft 41 is turned, to rock the bar 37 upon its pivot and thus turn the valve in its seat. The cam flange is preferably so made that it will give to the valve a quick opening and closing movement and will delay or hold the valve in the position shown in Fig. 5 during the compression and explosion periods of the engine cycle. The valve may thus be given a very quick opening to give the explosive charges free ingress and the exhaust port may be opened at the desired time and held open as long as necessary, then quickly closed, to give the products of combustion ample time to escape. During the compression and explosion periods the valve is held with its expansion members 15 and 16 in a horizontal position so that the members 15 will be forced by the compression or explosion into firm contact with the valve seat adjacent to the inlet and exhaust ports, thus insuring a tight joint and the holding of the compression in the cylinder.

The packing strips 21 are preferably formed with parallel inclined or beveled side edges as shown in Fig. 7 forming sharp angles 42 and 43 on these strips which angles are adapted to be forced by the force of the explosion or compression in the cylinder, against the surface of the heads of the valve and the lower surface of the plate 16, and thus make a very tight joint which will effectually prevent any leakage around the ends of the plate 16 or strips 15. By forming these strips with the slanting sides, they have a tendency to tilt when the compression or explosion comes against their inner inclined edges and thus their sharp angles are brought into firm engagement with the adjacent surfaces.

Obviously, changes in the details of construction may be made without departing from the spirit of my invention and I do not care to limit myself to the particular form or arrangement shown.

Having thus fully described my invention what I claim is:—

1. The combination with an engine cylinder having a valve seat and ports opening through said seat, of a valve controlling said ports, packing members carried by said valve, and a member exposed to and moved by the action of internal pressure in the cylinder to move said packing members and make a tight joint between said valve and seat.

2. The combination with an engine cylinder having a valve seat extending at right angles thereto and provided with ports opening through the valve seat, said cylinder communicating with said seat through one side thereof, of a valve in said seat bridging the opening into the cylinder and adapted to be turned to open and close said ports, packing members carried by the valve to engage the seat, and a member on the valve opposite the opening into the cylinder adapted to be moved by internal pressure in the cylinder to move the packing members into contact with the seat.

3. The combination with an engine cylinder having a bore extending transversely to the longitudinal axis of the cylinder and forming a seat for a valve, said cylinder being formed with ports opening through said seat, of a valve within said bore adapted to be turned therein to open and close said ports, packing members at each side of the valve to engage the bearing surface of the bore adjacent to said ports, and a wedge member carried by the valve and adapted to be moved by internal pressure in the cylinder to force said members outwardly on the valve into engagement with the said surface of the bore.

4. The combination with an engine cylinder having a valve seat and ports opening through said seat, said seat communicating with the interior of the cylinder through one side of said seat, of a valve in said seat, members on said valve movable thereon into engagement with the seat and having inclined adjacent sides, and a member engaging said inclined sides and adapted to be moved upon the valve between said members by internal pressure within the cylinder to force said members into contact with the valve seat.

5. The combination with an engine cylinder having a valve seat and ports opening through said seat, of a valve in said seat, packing members extending along the sides of the valve to engage the seat, a wedge plate movable upon the valve to force said members into engagement with said seat, and packing strips carried by the valve in engagement with the ends of the wedge plate and packing members.

6. The combination of a cylinder having a bore forming a valve seat open at one side into the cylinder and provided with ports opening through the sides of said seat, a valve in said seat having end members fitting the bore of the seat to turn therein, a bridge connecting said members and extending across the bore to cover and uncover said ports, and means for oscillating said valve.

7. The combination with a cylinder having a bore forming a valve seat, a valve fitting in said seat to turn therein and provided with a circumferential groove, a split ring engaging said groove, and means inserted between the ends of said ring to expand the same within the bore.

8. The combination with a cylinder formed with a bore provi g a seat for a valve, a valve in said seat to rn therein and formed with circumferential grooves, split rings in said grooves having counter sinks in their split ends, said cylinder being formed with screwthreaded openings opposite the counter-sinks in the rings, and means to engage said screwthreaded openings and adapted to engage at their inner ends the counter-sinks in the rings to spread the ends of the rings apart and expand the same within the bore forming the valve seat.

9. The combination of a cylinder having a bore forming a seat for a valve extending transversely to the bore of the cylinder and opening at one side into the end of the cylinder bore, said cylinder being also provided with ports opening into the sides of the bore for the valve, a piston in the cylinder, a valve comprising heads fitting within the bore forming a valve seat to turn therein at each side of the vertical plane of the bore of the cylinder, a bridge connecting said heads and adapted to cover and uncover said ports, and means for oscillating the valve.

10. The combination of a cylinder having a bore forming a valve seat extending across the upper end of the bore of the cylinder and opening at one side into said cylinder bore, said cylinder being also provided with ports opening through the sides of the valve seat, a piston in the cylinder, a valve in the valve seat comprising end members fitting within the seat to turn therein, a connecting member extending across the seat with its side edges in contact with the surface of the seat, said connecting member extending across the seat below the horizontal plane of said ports when said valve is in one position, and means for imparting to said valve an irregular oscillatory movement in timed relation to the movement of the piston.

11. The combination of a cylinder formed with a cylinder bore and a bore forming a valve seat extending transversely to the cylinder bore and into which the cylinder bore opens at its upper end, said cylinder being also formed with inlet and exhaust passages opening into the sides of the valve seat, a piston in the cylinder bore, a valve in the valve seat having heads to fit within the bore forming said seat, and provided with a bridge connecting said heads having side edges engaging the surface of the seat, packing strips carried by the bridge to engage the valve seat, packing rings carried by the heads in engagement with the valve seat, and means for turning the valve.

12. The combination of a cylinder having a bore forming a valve seat, a valve in said bore comprising heads fitting within the bore to turn therein, a bridge connecting said heads, packing members carried by the bridge to engage the surface of the bore, a plate on the bridge interposed between the packing members, means for holding the plate in place and permitting movement thereof toward the bridge to move the packing members into engagement with the surface of the bore, and means for turning the valve.

13. The combination with a cylinder formed with a bore providing a seat for a valve, of a valve in said seat comprising end heads to fit within the bore and turn therein, a bridge connecting the heads, packing strips along the lower face of the bridge at each edge thereof formed with inclined adjacent sides, a wedge plate between said strips having inclined edges to engage the strips and force the same laterally into engagement with the surface of the bore, bolts for attaching the wedge plate to the bridge bar, said bridge being cut away at its side adjacent to the wedge plate to permit the movement of the plate toward the bridge, and means for turning the valve.

14. The combination of a cylinder having a bore forming a valve seat, a valve in said seat comprising heads fitting within the bore, a bridge connecting said heads, packing strips extending along the edges of the bridge at the lower side thereof, a wedge plate interposed between said strips to force the same into engagement with the surface of the bore, said bridge and strips being cut away in their outer faces to form lubricant grooves, and the bridge being cut away opposite the wedge plate to form a lubricant chamber to supply lubricant to said grooves, packing strips carried by said heads in engagement with the ends of said plate, and means for turning the valve.

15. The combination with a cylinder having a bore forming a valve seat, of a valve in said seat comprising heads fitting within the bore, a bridge connecting said heads, packing members extending along the edges of the bridge in contact with the surface of the bore, a wedge plate interposed between said packing members, ledges upon the inner sides of the heads provided with grooves in their sides adjacent to the lower face of the wedge plate, packing strips in said grooves formed with inclined sides providing sharp angles to engage the lower face of said wedge plate and the inner face of the heads, and spring members beneath the packing strips within said grooves.

In testimony whereof I affix my signature in presence of two witnesses.

ALBERT M. GILBERT.

Witnesses:
 LEWIS E. FLANDERS,
 ANNA M. SHANNON.